UNITED STATES PATENT OFFICE.

KARL SCHIRMACHER, OF HÖCHST-ON-THE-MAIN, GERMANY, ASSIGNOR TO THE FARBWERKE, VORMALS MEISTER, LUCIUS & BRÜNING, OF SAME PLACE.

RED-BROWN MONOAZO DYE AND PROCESS OF MAKING SAME.

SPECIFICATION forming part of Letters Patent No. 624,256, dated May 2, 1899.

Application filed February 17, 1899. Serial No. 705,773. (Specimens.)

*To all whom it may concern:*

Be it known that I, KARL SCHIRMACHER, Ph. D., a citizen of the Empire of Germany, residing at Höchst-on-the-Main, Germany, have invented certain new and useful Improvements in the Manufacture of Monoazo Dyestuffs for Wool, of which the following is a description.

I have found that valuable black dyeing monoazo dyestuffs for wool may be obtained by combining diazotized picramic acid with alkylated amidonaphtholsulfonic acids, such as 2:5:7 ethylamidonaphthol, 2:5:7 methyl-amidonaphtholsulfonic acids.

I illustrate my process by the following example: To a solution of 26.0 kilograms of 2:5:7 alkylamidonaphtholsulfonic acid made alkaline with soda is added the diazo compound obtained by diazotizing 19.9 kilograms of picramic acid. The formation of the dyestuff is complete after several hours, and the solution is then boiled, precipitated with common salt, and pressed. When in a dry state, the dyestuff has the form of a brilliant greenish-black powder, soluble in water with a blue-red color, which is not changed by alkalies. It is soluble in concentrated sulfuric acid with a red color, and it dyes wool in red-brown shades, which become deep black on subsequent treatment with chromates.

Having now described my invention, what I claim is—

1. A process for the manufacture of monoazo dyestuffs for wool which consists in combining diazotized picramic acid with alkylamidonaphtholsulfonic acids, substantially as described.

2. As new products the new dyestuffs from diazotized picramic acid with alkylamidonaphtholsulfonic acids, being brilliant powders, soluble in water with a red color, which does not change on addition of alkalies, soluble in concentrated sulfuric acid with a red color and dyeing wool in red-brown shades, which become deep black on subsequent treatment with chromates.

3. As a new product the new dyestuff from diazotized picramic acid and 2:5:7 monoalkyl-amidonaphtholsulfonic acid, being a brilliant powder soluble in water with a red color, which does not change on addition of alkalies, soluble in concentrated sulfuric acid with a red color and dyeing wool red brown, which becomes a deep black on subsequent treatment with chromates.

In testimony that I claim the foregoing as my invention I have signed my name in presence of two subscribing witnesses.

KARL SCHIRMACHER.

Witnesses:
HEINRICH HAHN,
ALFRED BRISBOIS.